Aug. 31, 1965   N. F. PRIEST ETAL   3,203,733
SAFETY DEVICES FOR VEHICLES
Filed March 18, 1963
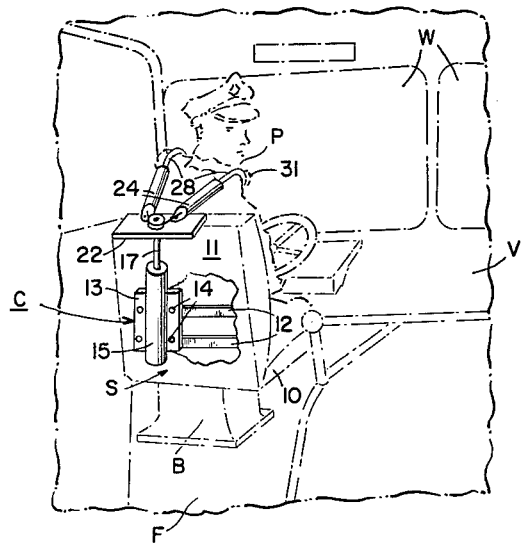
FIG. 1
FIG. 2
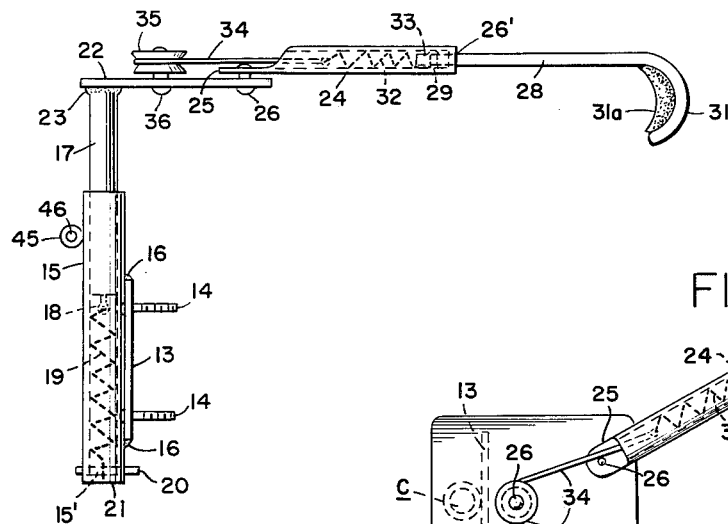
FIG. 3
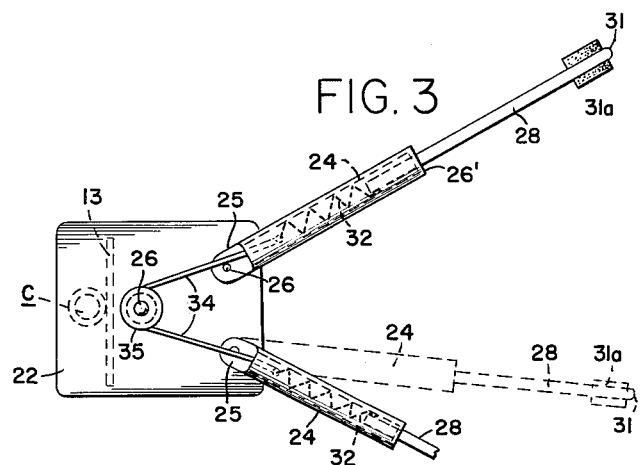
FIG. 4
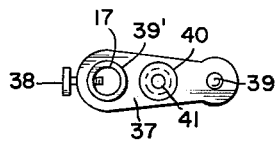
INVENTORS
NORMAN F. PRIEST
MAXIM D. LEVINRAD
BY *Joseph Y. Trunk*
ATTORNEY United States Patent Office 3,203,733
Patented Aug. 31, 1965

3,203,733
SAFETY DEVICES FOR VEHICLES
Norman F. Priest, Springfield, Va. (Rte. 1, Box 1, Huntsville, Tex.), and Maxim D. Levinrad, 105 Rue de la Gare, Orleans, Loriet, France
Filed Mar. 18, 1963, Ser. No. 265,779
4 Claims. (Cl. 297—389)

The present invention relates to improvements in safety devices for vehicles, and more particularly to a safety device for the passengers of a motor vehicle to prevent the passengers from being thrust forward when the vehicle collides or when the brakes are applied rapidly.

One object is to provide a safety device which is attached to the rear of a passenger seat back and arranged to extend over the passenger's shoulders on both sides of the neck to positively hold the passenger of the vehicle in position from being violently thrust forward should the vehicle be involved in a collision with another vehicle, or in the event that the brakes are applied rapidly and thus prevent the driver or passenger from being thrown forward and striking his head and face on the windshield.

Another object is to provide a safety device for passenger vehicles in which yieldingly mounted body engaging members are arranged to extend over the shoulders on opposite sides of the neck of the passenger to permit normal body movement while traveling in the vehicle, and to exert a yielding rearward force on the upper portion of the passenger's body in the event that the vehicle strikes an object or collides with another vehicle.

Another object is to provide a safety device in which the yieldingly mounted body engaging members can be pivoted to swing horizontally in opposed directions so that they can be engaged and disengaged from the passenger's shoulders with ease and facility when the passenger enters the vehicle or leaves the same.

Another object is to provide a safety device for motor vehicles in which the yieldingly mounted shoulder engaging arms can be raised or lowered above the passenger's body while the passenger is entering or leaving the vehicle to permit the shoulder engaging arms to be easily swung on their pivot axis into and out of their operative position.

Another object is to provide a safety device for motor vehicles in which the yieldingly mounted shoulder engaging arms are connected by flexible cable means trained over a pulley to permit compensating movement of said arms when the passenger assumes various positions while riding in the vehicle without discomfort to the passenger.

Another object is to provide a safety attachment for motor vehicles to prevent the passenger from being thrown forward into engagement with the windshield of the vehicle which can be quickly and easily affixed to the frame structure of the seat back.

Another object is to provide a safety seat device for motor vehicles and the like which will retain the passenger in the vehicle seat and prevent him from being thrown out of the vehicle or through the windshield, but yet will permit normal body movement of the passenger while riding in the vehicle and will enable the passenger to engage and disengage the device when entering and leaving the vehicle.

Other objects and advantages of the invention will become apparent during the course of the following description of the accompanying drawing, wherein FIGURE 1 is a perspective view of the safety device illustrating the manner in which the same is attached to the frame structure of a seat back of the vehicle and the manner in which the shoulder engaging arms engage the passenger's body on opposite sides of the neck.

FIGURE 2 is a side elevational view of the safety device showing the same greatly enlarged to illustrate the various structural details thereof.

FIGURE 3 is a top elevational view of the safety device showing the manner in which the shoulder engaging arms are pivotally attached to the supporting plate and the flexible cable means for connecting the arms to permit normal body movement when the arms are in their operative position, and FIGURE 4 is a top elevational view of a modified form of the invention illustrating a bracket constructed to pivotally support both of the shoulder engaging arms on a common pivot.

In the drawing, and more in detail, attention is first directed to FIGURE 1 wherein the reference character V will generally be meployed to designate a motor vehicle such as a passenger sedan, bus or truck having the usual windshield structure W and one or more passenger and driver seats S. As shown, the seat S is of the single passenger type and has its base B mounted on the vehicle floor F. The vehicle seat generally designated S embodies an upholstered seat portion 10 and an upholstered back portion 11. The back portion 11 is shown broken away to illustrate the metal frame members 12 which extend horizontally and have their ends welded or otherwise affixed to the seat frame structure by welding or the like (not shown). The passenger P is supported on the seat portion 10 with his back resting against the seat back 11.

The invention comprises a safety attachment generally designated C which is affixed to the frame structure of the seat back 11, and said safety attachment includes an anchoring plate 13 having suitable openings in the corners thereof spaced to coincide with corresponding openings in the frame bars 12 of the seat back to accommodate suitable fastener means such as threaded fasteners 14 which extend through the upholstery and frame members 12 and are held in place by correspondingly threaded nuts.

Rigidly secured to the plate 13 as by welding or the like indicated as at 16 is a tubular support 15 which extends substantially parallel with the seat back 11 and terminates a short distance from the upper edge of said seat back. The lower end of said tubular support 15 is closed by a wall 15', while the other end is provided with a slidably mounted rod 17 provided on its inner end with a screw eye 18 to which is affixed one end of the coil spring 19. The coil spring being provided with a hooked end received in said screw eye 18. The other end of the coil spring 19 is anhcored by means of a transverse pin 20 which passes through aligned openings in the wall of the tubular support 15 and extends through the other hooked end 21 of the coil spring 19.

Secured to the upper end of the sliding rod 17 is a supporting plate 22 which extends normal thereto and is welded in place as at 23. The plate 22 may be of any desired shape and is adapted to pivotally support a pair of arms 24 of tubular construction with one end flattened as at 25 and shaped to provide an opening in the inner end of the tubular support 24 as well as the outer end. The cut away and flattened portions 25 of the arms 24 are pivotally attached to the supporting plate 22 by suitable fasteners 26 such as rivets or the like, and are mounted in spaced relation adjacent the forward edge of said plate 22.

The outer ends of the tubular members 24 are bent inwardly as at 26' and an opening is provided therein for the passage of shoulder engaging rods 28 having hooked ends 31 which extend downwardly and are adapted to engage over the shoulders of the passenger P when in their operative position. The shoulder engaging rod 28 is slidably mounted in the tubular arm 24 and is provided with an enlarged annular portion 29 forming a stop engageable with the inturned wall portion 26' on the outer end of the tubular support 24. Connected to the inner ends of the shoulder engaging rods 28 is a coil spring 32 which is received in the tubular members 24 and may be connected to the inner end of the rod 23 by having its hooked end extending through an opening 33. The opposite ends of the coil springs 32 are connected to a flexible cable 34 which is trained over a pulley 35 pivotally mounted on the supporting plate 22 by means of a rivet or the like 36. Thus, when a pull force is exerted on one of the shoulder engaging rods 28 the other rod will be retracted in the cylindrical or tubular arm 24, and movement of the passenger held by the hooked ends 31 will be permitted without the hooked portions becoming disengaged from the passenger's upper body portion.

The hooked portions 31 are adapted to be covered by foam rubber pads 31a (FIGURE 2) formed to fit the contour of the passenger's shoulders so that no discomfort will be experienced by the passenger when the safety device is in its operative position.

In the modified form of the invention shown in FIGURE 4 the tubular bracket assembly including the base 13 and tubular support 15 for receiving the slidably mounted rod 17 are the same, and in lieu of the supporting plate 22 a relatively small supporting plate 37 is provided and is secured in place by suitable fastener means such as a threaded fastener 38. The plate 37 is provided with a collar 39' through which the threaded fastener 38 extends for engaging the rod 17. A pivot pin 39 is provided on the opposite end of the plate 37 and is adapted to pivotally receive both of the flattened portions 25 of the tubular members 24. That is, the tubular flattened portions 25 of the tubular members 24 are arranged in overlapping relation so that the fastener element 39 may extend through the aligned openings therein and form a common pivot for said tubular arms 24. As before, a pulley 40 is pivotally secured to the arm 37 by means of a pivot pin 41 to accommodate the flexible cable 34 which is attached to the coil springs 32 in the manner described in connection with the form of the invention shown in FIGURES 1 to 3 inclusive.

In operation, the safety device C is affixed to the frame structure 12 of the seat back 11 and the passenger P can spread the hooked ends 31 of the arms 28 apart horizontally on their pivot axis 26 and move them into position so that the hooked ends 31 engage the shoulder portions on opposite sides of the neck. After said arms are in position the passenger may assume various positions while riding in the vehicle and should the vehicle strike an object or other vehicle, he will be prevented from being hurled through the windshield W as well as from his seated position within the vehicle. The coil spring 19 yieldingly urges the arms 28 downwardly into engagement with the shoulders to hold the hooked portions 31 in their proper position, and when the driver or passenger desires to leave the vehicle, he grasps the arms 28 and forces them upwardly against the action of the coil spring. Simultaneously, he may separate the arms about their pivot axis 26 so that the downwardly extending hooked portions 31 engage over the top edge of the seat 11. When the arms 28 are released the spring 19 will urge the arms and the hooked ends 31 downwardly to be held in their separated position by engagement with the upper edge of the seat back 11.

Under normal driving conditions the driver or passenger may assume different comfortable positions and may twist the torso from right or left with the flexible cable 34 compensating for different variations of seating posture.

The hooked ends 31 of the arms 28 may be completely covered by foam rubber suitably molded thereon or otherwise attached thereto. In addition, the hooked end portions 31 can be flattened to provide a relatively broad shoulder engaging portion and a supporting base structure for the foam rubber padding 31a.

The tubular portion 15 may be provided with a lug 45 having an opening 46 for receiving a cable or the like which may extend rearwardly to the floor F of the vehicle to further aid in bracing the safety device C.

It is to be understood that the forms of the invention herewith shown and described are to be taken as preferred embodiments of the invention, and that various changes in the shape, size and arrangement of parts may be resorted to without departing from the spirit of the invention or the scope of the subjoined claims.

We claim:

1. In combination with a vehicle having a seat provided with a seat back and constructed of a metallic frame, a safety device supported by said frame including a tubular member secured to said frame, a rod slidably mounted in said tubular member, a spring for yieldingly urging said rod within said tubular member, a supporting plate secured to the upper end of said rod, a pair of tubular arms pivoted to said supporting plate, telescopic arms slidably mounted in said tubular arms, shoulder engaging portions on the outer ends of said arms to engage the shoulders of a passenger occupying said seat, a pulley on said supporting plate, and a flexible cable trained over said pulley with one end connected to one of said telescopic arms and the other end connected to the other of said telescopic arms.

2. In combination with a vehicle having a seat provided with a seat back and constructed of a metallic frame, a safety device supported by said frame comprising a tubular member secured to said seat frame and extending upwardly from the rear of said seat back, a rod slidably mounted in said tubular member, a spring connected to said rod and tubular member for yieldingly urging said rod within said tubular member, a supporting plate affixed to the upper end of said rod, a pair of tubular arms mounted on said supporting plate and extending forwardly over the top of said seat back, telescopic arms slidably mounted in said tubular arms, shoulder engaging portions on the outer ends of said arms to engage the shoulders of a passenger occupying said seat, a pulley on said supporting plate, a flexible cable trained over said pulley with the ends extending into said tubular arms, and spring members yieldingly connecting the inner ends of said telescopic arms to the ends of said flexible cable.

3. A safety device for vehicle seats, comprising support means affixed to the back of the seat, a pair of tubular arms secured to said support means, telescopic arms mounted in said tubular arms having shoulder engaging portions formed on the free ends thereof to engage the shoulders of a passenger occupying said seat, a pulley on said support means, and a cable connected to the inner ends of said telescopic arms and trained over said pulley to permit said telescopic arms to be moved in alternate directions and allow the passenger to turn his shoulders about a vertical axis.

4. A safety device for vehicle seats, comprising support means affixed to the seat back of said vehicle seat, a pair of tubular arms secured to said support means, telescopic arms for each of said tubular arms, the free ends of said last named arms being shaped to provide shoulder engaging portions adapted to engage the shoulders of a passenger occupying said seat, a pulley on said support means, a cable trained over said pulley with its ends extending into said tubular arms, and spring members yieldingly connecting the inner ends of said telescopic arms to the ends of said cable to permit yielding forward movement of the passenger and to restrain said passenger's movement beyond a predetermined distance.

References Cited by the Examiner

UNITED STATES PATENTS

| | | | |
|---|---|---|---|
| 2,136,852 | 11/38 | Knauth | 297—390 |
| 2,148,953 | 2/39 | Meissner | 297—389 |
| 2,165,698 | 7/39 | Eyerly | 297—389 |
| 2,873,122 | 2/59 | Peras | 297—384 |

FRANK B. SHERRY, *Primary Examiner.*